(12) United States Patent
Chang

(10) Patent No.: US 11,288,223 B2
(45) Date of Patent: Mar. 29, 2022

(54) BRIDGE CHIP WITH FUNCTION OF EXPANDING EXTERNAL DEVICES AND ASSOCIATED EXPANSION METHOD

(71) Applicant: Realtek Semiconductor Corp., HsinChu (TW)

(72) Inventor: Chun-Chu Chang, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/083,316

(22) Filed: Oct. 29, 2020

(65) Prior Publication Data
US 2021/0141755 A1 May 13, 2021

(30) Foreign Application Priority Data
Nov. 8, 2019 (TW) .................. 108140576

(51) Int. Cl.
*G06F 13/40* (2006.01)
*G06F 1/18* (2006.01)

(52) U.S. Cl.
CPC .......... *G06F 13/4027* (2013.01); *G06F 1/185* (2013.01)

(58) Field of Classification Search
CPC .... G06F 13/4027; G06F 1/185; G06F 1/1698; G06F 1/1632
See application file for complete search history.

(56) References Cited

U.S. PATENT DOCUMENTS

| | | | | |
|---|---|---|---|---|
| 5,850,530 A * | 12/1998 | Chen | ...................... | G06F 13/364 710/113 |
| 5,875,310 A * | 2/1999 | Buckland | ............ | G06F 13/4081 710/309 |
| 9,429,992 B1 * | 8/2016 | Ashenbrenner | ..... | G06F 13/4081 |
| 2005/0246470 A1 * | 11/2005 | Brenner | ................ | G06F 1/1632 710/303 |
| 2006/0004935 A1 * | 1/2006 | Seto | .................... | G06F 13/4027 710/62 |
| 2007/0120752 A1 * | 5/2007 | Takasu | .................. | G06F 1/1616 343/702 |
| 2007/0214299 A1 * | 9/2007 | Lo | ........................... | G06F 1/185 710/301 |

(Continued)

FOREIGN PATENT DOCUMENTS

TW 200734887 9/2007
TW 201321957 A1 6/2013

*Primary Examiner* — Glenn A. Auve
(74) *Attorney, Agent, or Firm* — Winston Hsu

(57) ABSTRACT

A bridge chip with a function of expanding external devices and an associated expansion method are provided, wherein the bridge chip may include at least one transmission interface, a bridge control unit and a connecting port. The transmission interface may be configured to make at least one external device outside the bridge chip couple to the bridge chip; the bridge control unit is coupled to the transmission interface, and may be configured to control priority of the external device for performing data transmission; and the connecting port is coupled to the bridge control unit, and may be configured to make the bridge chip couple to a host device, to allow the host device to perform data transmission with the external device. More particularly, a number of the external device is expandable.

16 Claims, 5 Drawing Sheets

(56) References Cited

U.S. PATENT DOCUMENTS

| | | | | |
|---|---|---|---|---|
| 2008/0040520 | A1* | 2/2008 | Caulkins | G06F 13/385 |
| | | | | 710/104 |
| 2008/0104297 | A1* | 5/2008 | Lu | G06F 13/409 |
| | | | | 710/301 |
| 2008/0256283 | A1* | 10/2008 | Chiu | G06F 13/385 |
| | | | | 710/306 |
| 2008/0276027 | A1* | 11/2008 | Hagita | G06F 13/24 |
| | | | | 710/263 |
| 2009/0177780 | A1* | 7/2009 | Chen | H04L 12/12 |
| | | | | 709/227 |
| 2010/0185792 | A1* | 7/2010 | Yao | G06F 13/4027 |
| | | | | 710/33 |
| 2013/0132746 | A1* | 5/2013 | Chen | G06F 1/26 |
| | | | | 713/310 |
| 2013/0318513 | A1* | 11/2013 | Chu | G06F 13/4027 |
| | | | | 710/308 |
| 2015/0052404 | A1* | 2/2015 | Henriques | G06F 13/385 |
| | | | | 710/302 |
| 2015/0113195 | A1* | 4/2015 | Kim | G06F 13/4027 |
| | | | | 710/308 |
| 2016/0170926 | A1* | 6/2016 | Que | G06F 13/385 |
| | | | | 710/302 |
| 2019/0354483 | A1* | 11/2019 | Jin | G06F 3/0679 |
| 2020/0117248 | A1* | 4/2020 | Chen | G06F 1/185 |

\* cited by examiner

BRIDGE CHIP WITH FUNCTION OF EXPANDING EXTERNAL DEVICES AND ASSOCIATED EXPANSION METHOD

BACKGROUND OF THE INVENTION

1. Field of the Invention

The present invention is related to bridge chips, and more particularly, to a bridge chip with a function of expanding external devices, and an associated expansion method.

2. Description of the Prior Art

Usage of various types of wireless communications applications is increasing. Typically, Bluetooth® is used for short distances transmission, and Wi-Fi, ZigBee and Long Term Evolution (LTE) are used for middle/long distances. Ideally, a single host device executes these various types of wireless communications functions concurrently; however, the corresponding implementations may greatly increase hardware costs. Moreover, it is not always possible to change or add device(s) therein (e.g. expanding/adding other wireless communications functions) after the hardware is implemented.

Thus, there is a need for a novel control chip architecture and an associated method which can implement a function of expanding external device(s) without introducing any side effect or in a way that is less likely to introduce side effects.

SUMMARY OF THE INVENTION

An objective of the present invention is to provide a bridge chip with a function of expanding external devices and an expansion method which can implement the function of expanding external devices (e.g. modules or chips respectively configured for performing different types of wireless communications) without introducing any side effector in away that is less likely to introduce side effects.

At least one embodiment of the present invention provides a bridge chip with a function of expanding external devices. The bridge chip may comprise at least one transmission interface, a bridge control unit and a connecting port. The aforementioned transmission interface may be configured to make at least one external device outside the bridge chip couple to the bridge chip. The bridge control unit is coupled to the aforementioned at least one transmission interface, and may be configured to control priority of the aforementioned at least one external device for performing data transmission. The connecting port is coupled to the bridge control unit, and may be configured to make the bridge chip couple to a host device, to allow the host device to perform data transmission with the aforementioned external device. More particularly, a number of the aforementioned external device (e.g. one or more external devices) is expandable.

At least one embodiment of the present invention provides an expansion method for external devices, wherein the expansion method is applicable to a bridge chip. The expansion method comprises: utilizing at least one transmission interface within the bridge chip to make at least one external device outside the bridge chip couple to the bridge chip; utilizing a bridge control unit within the bridge chip to control priority of the aforementioned at least one external device for performing data transmission; and utilizing a connecting port within the bridge chip to make the bridge chip couple to a host device, to allow the host device to perform data transmission with the aforementioned at least one external device through the bridge chip. More particularly, a number of the aforementioned at least one external device (e.g. one or more external devices) is expandable.

The bridge chip and the associated expansion method for external devices of the present invention can allow a manufacturer to have sufficient flexibility with regards to manufacturing products according to different requirements and applications. In comparison with the related art, embodiments of the present invention will not greatly increase additional costs. Thus, the present invention can implement the function of expanding external devices without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
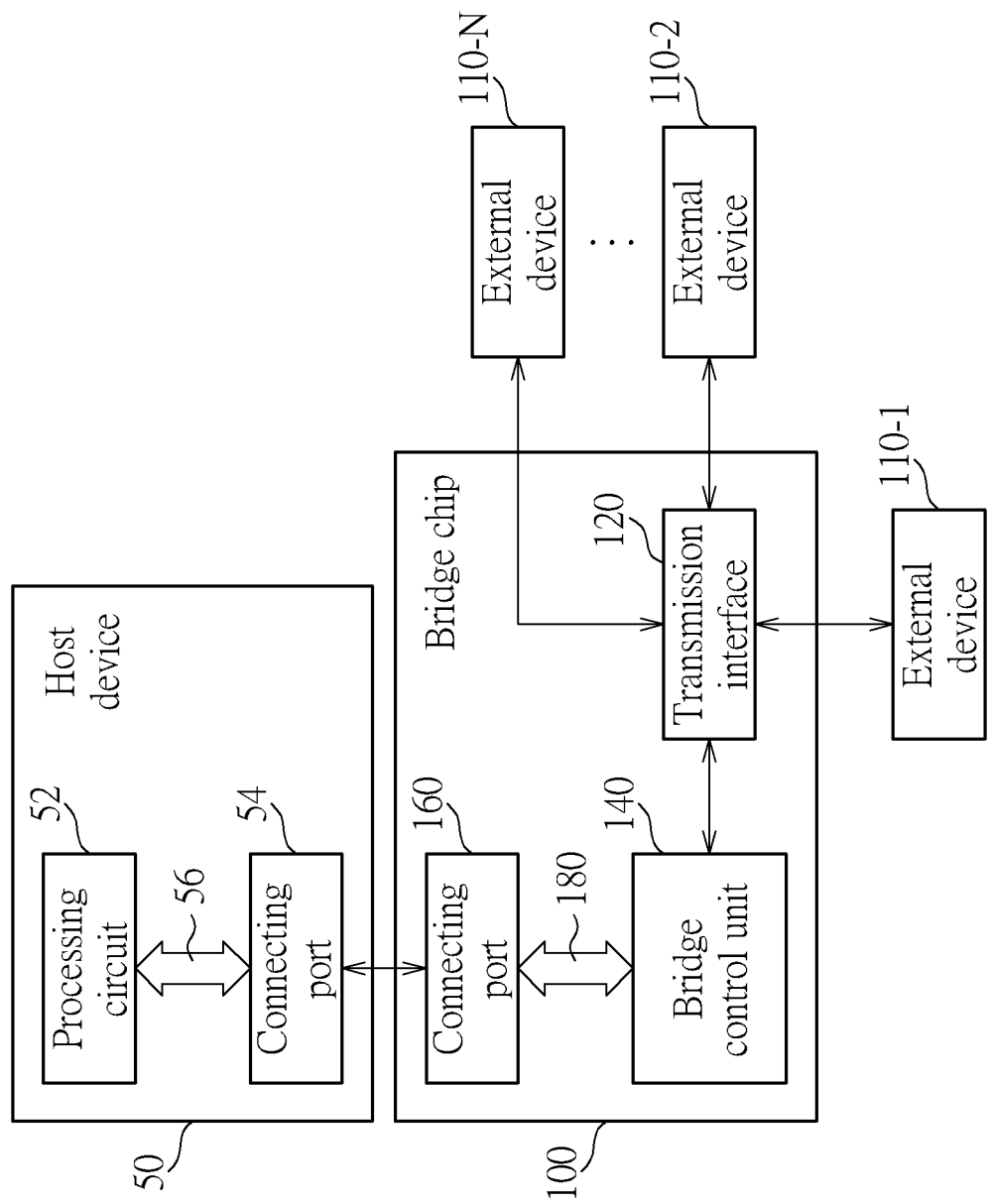
FIG. 1 is a diagram illustrating a bridge chip according to an embodiment of the present invention.

FIG. 1 is a diagram illustrating a bridge chip 100 according to an embodiment of the present invention. The bridge chip 100 may be coupled (e.g. electrically connected or directly connected) to a host device 50. The host device 50 may comprise a processing circuit 52 and a connecting port 54 coupled to the processing circuit 52, where the processing circuit 52 may execute a program code to control operations of the host device 50, and the connecting port 54 is coupled to the processing circuit 52 through an interface 56 conforming to a Peripheral Component Interconnect Express (PCIe) protocol, a Universal Serial Bus (USB) protocol or a Secure Digital Input/output (SDIO) protocol. The bride chip 100 comprises at least one transmission interface (e.g. one or more transmission interfaces), a bridge control unit 140 and a connecting port 160, where the bridge control unit 140 is coupled to the aforementioned at least one transmission interface such as a transmission interface 120, and the connecting port 160 is coupled to the bridge control unit 140 through an interface 180 conforming to the PCIe protocol, the USB protocol or the SDIO protocol.

In this embodiment, the aforementioned at least one transmission interface may be configured to make at least one external device (e.g. one or more external devices) outside the bridge chip 100 couple to the bridge chip 100, and the connecting port 160 may be configured to make the bridge chip 100 couple to the host device 50, to allow the host device 50 to perform data transmission with the aforementioned at least one external device through the bridge chip 100, where the bridge control unit 140 may be configured to control priority of the aforementioned at least one external device for performing data transmission. For example, when a plurality of external devices perform data transmission concurrently, the bridge control unit 140 has an arbitration function to control an order and an availability period of each of the plurality of external devices for performing data transmission. As shown in FIG. 1, the aforementioned at least one transmission interface may comprise a single transmission interface such as the transmission interface 120, and the aforementioned at least one external device may comprise one or more external devices such as external devices 110-1, 110-2, . . . and 110-N, where all of the external devices 110-1, 110-2, . . . and 110-N may be coupled to the transmission interface 120. In some embodiments, the transmission interface 120 may be implemented by an Inter-Integrated Circuit Bus (which may be referred to as I²C), but the present invention is not limited thereto. It should be noted that a number of the external device(s) coupled to the bridge chip 100 is expandable and/or adjustable, where N is a positive integer, and a manufacturer may decide the number of external devices coupled to the bridge chip 100. In one embodiment, when the bridge chip 100 is powered on, the bridge control unit 140 may determine a number of external devices, which have been coupled to the bridge chip, by accessing predetermined configuration/settings of an internal register or an external memory (e.g. an Erasable Programmable Read Only Memory (EPROM), not shown in the figures), to satisfy a specific transmission function. Alternatively, the host device 50 may access an internal register of the bridge control unit 140 to set the number of external device(s) that have been coupled.

In some embodiments, the aforementioned at least one external device may comprise at least one wireless communications chip (e.g. one or more wireless communications chip), where the aforementioned at least one wireless communications chip may comprise one or more of an Wi-Fi chip, a Bluetooth® chip, a Wi-Fi/Bluetooth® combo chip, a Long Term Evolution (LTE) chip and a ZigBee chip, and respective wireless communications chips may be the same or different types of wireless communications chips. In some embodiments, the aforementioned at least one external device may comprise at least one storage device (e.g. one or more storage devices), and respective storage devices may be the same or different types of storage devices, but the present invention is not limited thereto.

Figure 2:
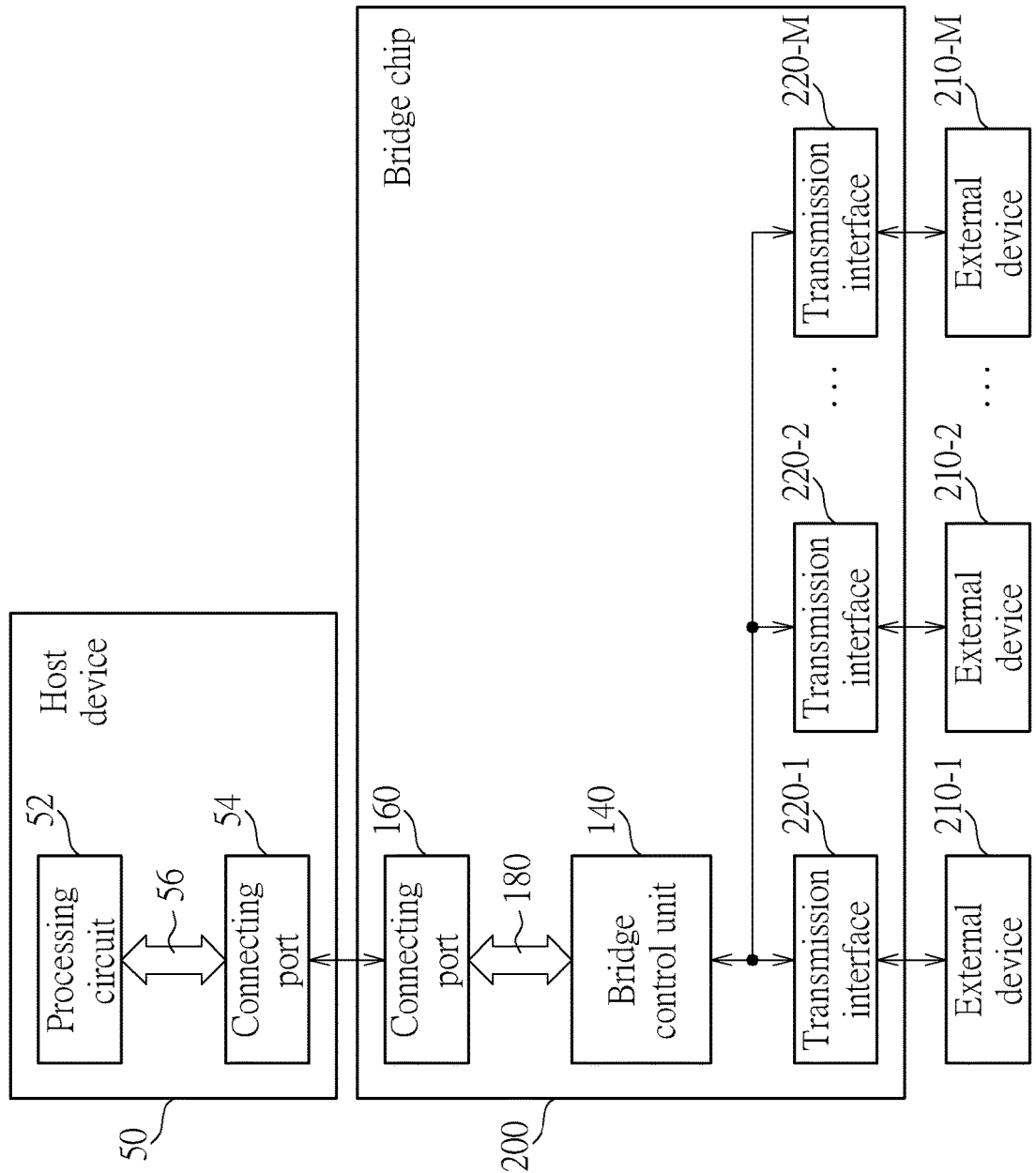
FIG. 2 is a diagram illustrating a bridge chip according to an embodiment of the present invention.

FIG. 2 is a diagram illustrating a bridge chip 200 according to an embodiment of the present invention, where the bridge chip 200 may be generated by modifying the architecture of the bridge chip 100 shown in FIG. 1, and may be coupled to the host device 50. In comparison with the bridge chip 100 using a single transmission interface, in this embodiment, the aforementioned at least one transmission interface may comprise a plurality of transmission interfaces 220-1, 220-2, . . . and 220-M, and the aforementioned at least one external device may comprise a plurality of external devices 210-1, 210-2, . . . and 210-M, where M may be a positive integer, and the external devices 210-1, 210-2, . . . and 210-M may be coupled to the transmission interfaces 220-1, 220-2, . . . and 220-M, respectively. In some embodiments, types of the transmission interfaces 220-1, 220-2, . . . and 220-M may be determined according to requirements (e.g. transmission rate/speed) of corresponding external devices, but the present invention is not limited thereto. It should be noted that a number of the external device(s) coupled to the bridge chip 200 is expandable and/or adjustable, where the manufacturer may decide the number of external devices coupled to the bridge chip 200. For example, the manufacturer may selectively use a portion or all of the transmission interfaces 220-1, 220-2, . . . and 220-M to be coupled to corresponding external devices according to requirements of respective products, but the present invention is not limited thereto.

Figure 3:
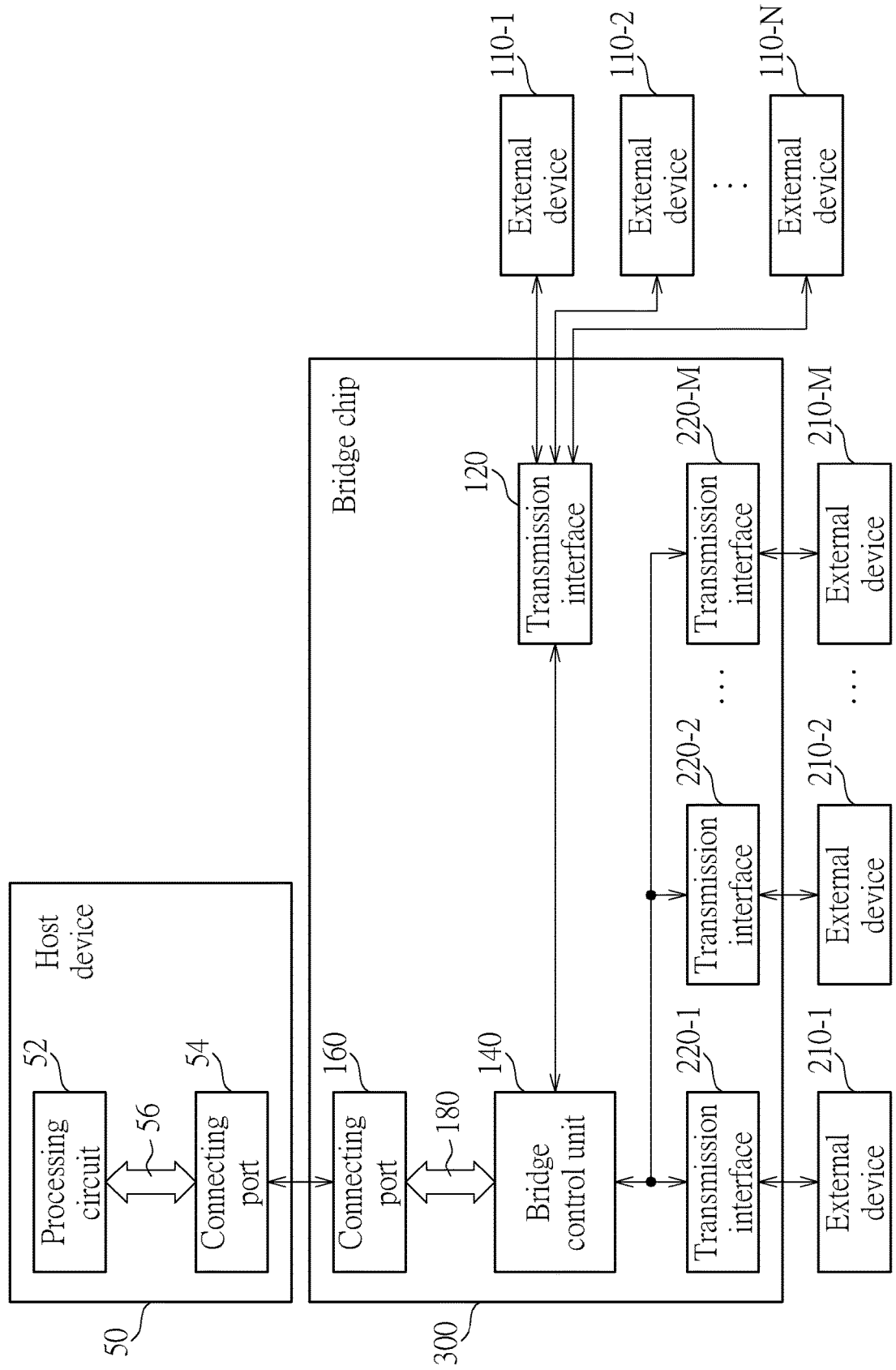
FIG. 3 is a diagram illustrating a bridge chip according to an embodiment of the present invention.

FIG. 3 is a diagram illustrating a bridge chip 300 according to an embodiment of the present invention, where the bridge chip 300 may be generated by combining the architecture of the bridge chip 100 shown in FIG. 1 and the architecture of the bridge chip 200 shown in FIG. 2, and may be coupled to the host device 50. As shown in FIG. 3, the aforementioned at least one transmission interface may comprise transmission interfaces suitable for multiple types of external devices, such as the transmission interface 120 that is suitable for all of the external devices 110-1, 110-2, . . . and 110-N, and may further comprise transmission interfaces respectively dedicated for one or more external devices, such as the transmission interfaces 220-1, 220-1, . . . and 220-M that are respectively dedicated for the external devices 210-1, 210-2, . . . and 210-M, but the present invention is not limited thereto. It should be noted that a number of the external device(s) coupled to the bridge chip 300 is expandable and/or adjustable. For example, the manufacturer may selectively use the transmission interface 120 to be coupled to one or more external devices and/or use a portion or all of the transmission interfaces 220-1, 220-2, . . . and 220-M to be coupled to corresponding external devices according to requirements of respective products, but the present invention is not limited thereto.

Figure 4:
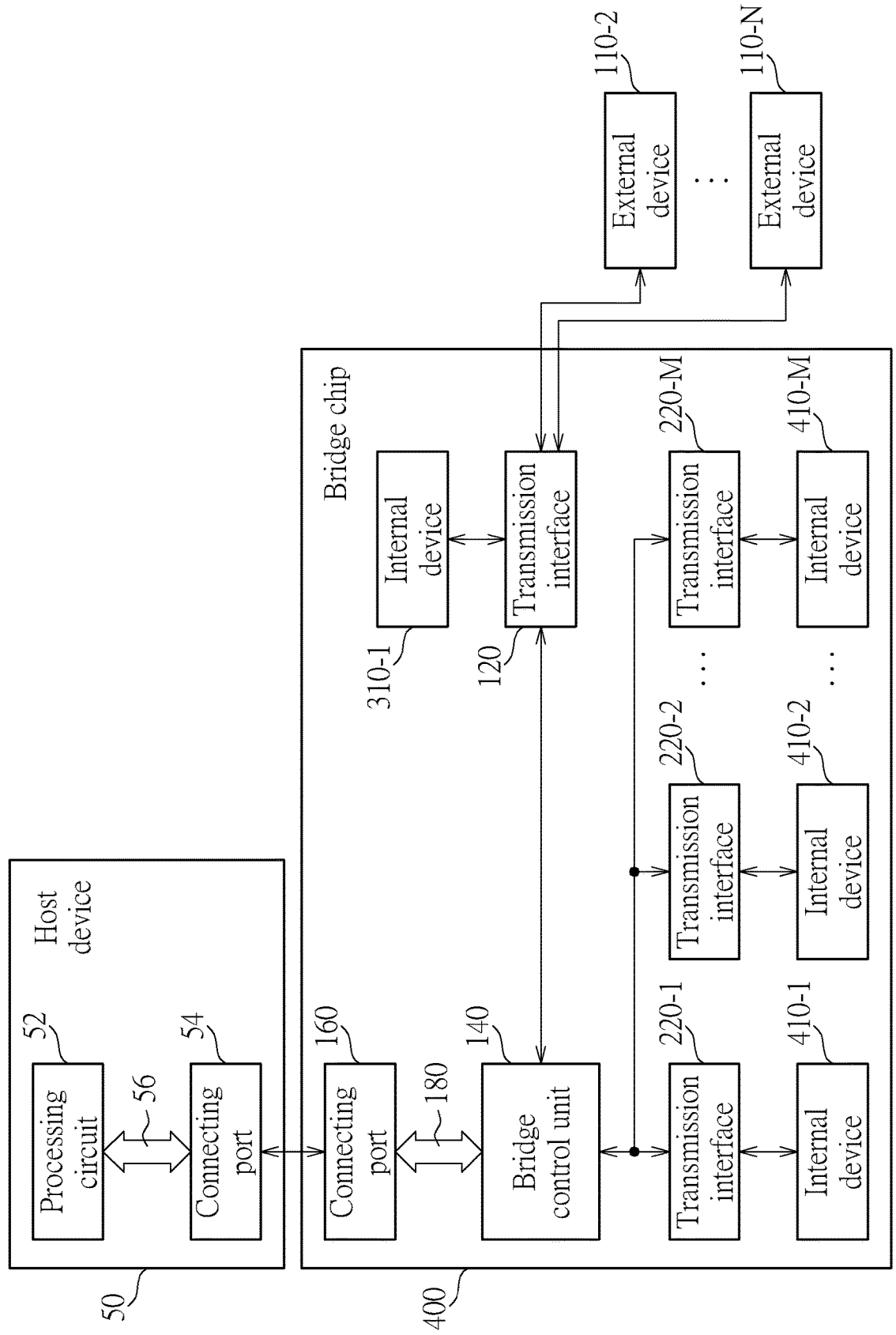
FIG. 4 is a diagram illustrating a bridge chip according to an embodiment of the present invention.

FIG. 4 is a diagram illustrating a bridge chip 400 according to an embodiment of the present invention. The bridge chip 400 may be coupled to the host device 50. In comparison with embodiments of FIG. 1 to FIG. 3, some external devices may be built in the bridge chip 400. In this embodiment, an internal device 310-1 may be regarded as an example of the external device 110-1 according to a point of view of circuit characteristics, and internal devices 410-1, 410-2, . . . and 410-M may be regarded as examples of the external devices 210-1, 210-2, . . . and 210-M according to a point of view of circuit characteristics. In comparison with the external devices 110-1 and the external devices 210-1, 210-2, . . . and 210-M, the internal device 310-1 and the internal devices 410-1, 410-2, . . . and 410-M are built in the bridge chip 400, and a manner of coupling is similar to that of the external devices 110-1 and the external devices 210-1, 210-2, . . . and 210-M (as shown in FIG. 4, the internal device 310-1 is coupled to the transmission interface 120, and the internal devices 410-1, 410-2, . . . and 410-M are coupled to the transmission interfaces 220-1, 220-2, . . . and 220-M). For example, products of most manufacturers need a certain function (e.g. Wi-Fi and/or Bluetooth® functions), and related chips such as a Wi-Fi chip and/or a Bluetooth® chip may be directly built in the bridge chip 400, where this Wi-Fi chip and this Bluetooth® chip may be an example of any of the internal devices 410-1, 410-2, . . . and 410-M, but the present invention is not limited thereto. It should be noted that the embodiment of FIG. 4 is for illustrative purposes only, and is not a limitation of the present invention. For example, the number of expandable external devices coupled to the transmission interface 120, and the number of internal devices coupled to the transmission interface 120 that are built in the bridge chip 400, are not limitations of the present invention; and in the transmission interfaces 220-1, 220-2, . . . and 220-M, the number of transmission interfaces configured to be coupled to external device that is expandable, and the number of transmission interfaces configured to be coupled to internal devices that is built in the bridge chip 400, are not limitations of the present invention. For brevity, similar descriptions of the above embodiments are not repeated in detail here.

In addition, the bridge control unit 140 controlling priority of the aforementioned at least one external device for performing data transmission is not limited to specific implementations. Any embodiment that can manage an order and/or allocated available time of a plurality of devices (e.g. a plurality of external devices, a plurality of internal devices, or at least one external device and at least one internal device) for performing data transmission when the plurality of devices perform data transmission, concurrently, also belongs to the scope of the present invention. In some embodiments, the bridge control unit 140 may control a number of time slots allocated to the aforementioned at least one external device for performing data transmission according to at least one weighting corresponding to the aforementioned at least one transmission interface. In addition, when the aforementioned at least one external device and another device need to perform data transmission, concurrently, the bridge control unit 140 determines an order of the aforementioned at least one external device and the other device for performing data transmission according to predetermined priority settings of the aforementioned at least one external device and the other device, wherein the other device may represent another external device (e.g. any external device within the external devices 110-1, 110-2, . . . and 110-N and the external devices 210-1, 210-2, . . . and 210-M in the aforementioned embodiments) coupled to the bridge chip (such as the bridge chip 100, 200, 300 and 400) of the present invention or an internal device (e.g. any internal device within the internal device 310-1 and the internal devices 410-1, 410-2, . . . and 410-M in the aforementioned embodiments) built in the bridge chip. For example, various wireless communications functions (e.g. the functions of the Wi-Fi chip, the Bluetooth® chip, the Wi-Fi/Bluetooth® combo chip, LTE and ZigBee) may be configured to have respective weightings, and the bridge control unit 140 may sequentially query modules corresponding to respective wireless communications functions as to whether there is data to be transmitted according to a ratio of these weightings on a timeline, wherein, in modules that need to transmit data, the module with the function thereof having a higher weighting may have more time (e.g. a greater number of time slots) to transmit data, but the present invention is not limited thereto. In another example, respective wireless communications functions (e.g. the functions of the Wi-Fi chip, the Bluetooth® chip, the Wi-Fi/Bluetooth® combo chip, LTE and ZigBee) may be configured to have respective weightings, and before a module corresponding to any wireless communications function needs to transmit data, this module may initiatively inform the bridge control unit 140, wherein, if there are two or more modules with corresponding wireless communications functions that need to transmit data (e.g. the bridge control unit 140 receives notifications from two or more modules, concurrently), the bridge control unit 140 may determine the order of data transmission according to respective priority of these modules, but the present invention is not limited thereto.

Figure 5:
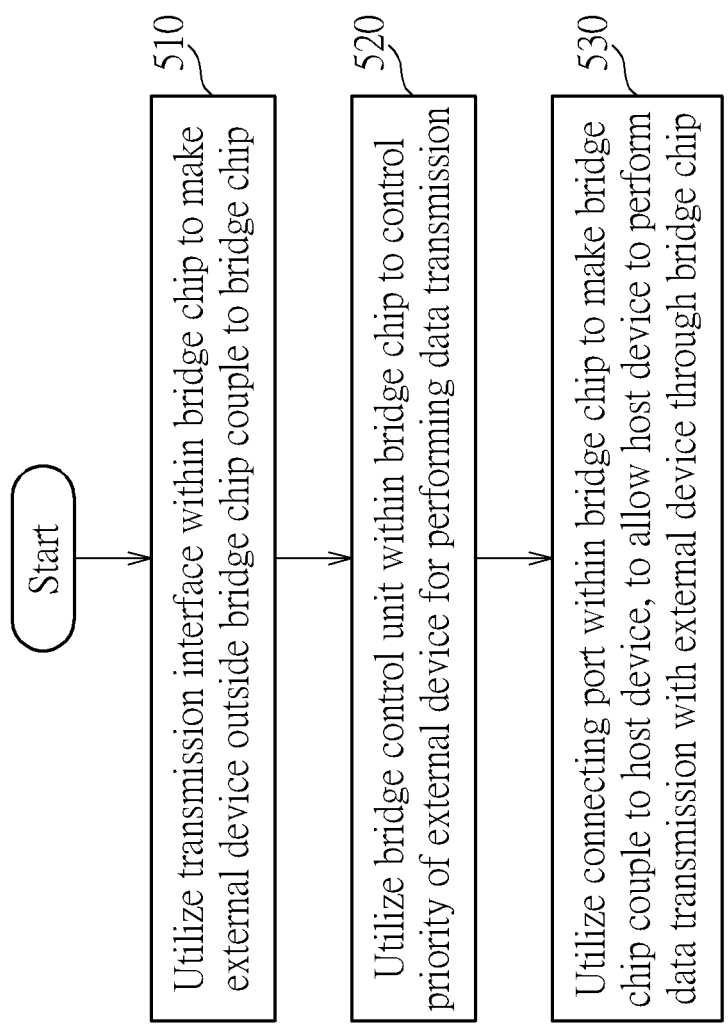
FIG. 5 is a diagram illustrating an expansion method for external devices according to an embodiment of the present invention.

FIG. 5 is a diagram illustrating an expansion method for external devices according to an embodiment of the present invention, where the expansion method is applicable to the bridge chip of the present invention, such as the bridge chip 100, 200, 300 and 400. It should be noted that, as long as an overall result would not be affected, one or more steps may be added, deleted and/or modified in the flow shown in FIG. 5, and these steps do not have to be executed in the exact order shown in FIG. 5.

In Step 510, the bridge chip utilizes at least one transmission interface therein to make at least one external device (e.g. one or more external devices) outside the bridge chip couple to the bridge chip, where a number of the external device(s) coupled to the bridge chip is expandable.

In Step 520, the bridge chip utilizes a bridge control unit therein to control priority of the aforementioned at least one external device for performing data transmission.

In Step 530, the bridge chip utilizes a connecting port therein to make the bridge chip couple to a host device, to allow the host device to perform data transmission with the aforementioned at least one external device through the bridge chip.

To summarize, the bridge chip and the associated expansion method for external devices of the present invention can allow a manufacturer to have sufficient flexibility with regards to manufacturing products in response to different requirements and applications, e.g. to selectively expand various types of wireless communications functions such as functions of the Wi-Fi chip, the Bluetooth® chip, the Wi-Fi/Bluetooth® combo chip, the LTE and the ZigBee. In addition, in comparison with the related art, embodiments of the present invention will not greatly increase additional costs. Thus, the present invention can implement the function of expanding external devices (e.g. modules or chips configured to execute various types of wireless communications functions) without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A bridge chip, comprising:
   at least one transmission interface, configured to make at least one external device outside the bridge chip couple to the bridge chip;
   a bridge control unit, coupled to the at least one transmission interface, configured to control priority of the at least one external device for performing data transmission, wherein the bridge control unit controls a number of time slots allocated to the at least one external device for performing data transmission according to at least one weighting corresponding to the at least one transmission interface; and
   a connecting port, coupled to the bridge control unit, configured to make the bridge chip couple to a host device, to allow the host device to perform data transmission with the at least one external device.

2. The bridge chip of claim 1, wherein the connecting port is coupled to the bridge control unit through an interface conforming to a Peripheral Component Interconnect Express (PCIe) protocol, a Universal Serial Bus (USB) protocol or a Secure Digital Input/output (SDIO) protocol.

3. The bridge chip of claim 1, wherein the at least one transmission interface comprises a single transmission interface, the at least one external device comprises a plurality of external devices, and all of the plurality of external devices are coupled to the single transmission interface.

4. The bridge chip of claim 1, wherein the at least one transmission interface comprises a plurality of transmission interfaces, the at least one external device comprises a plurality of external devices, and the plurality of external devices are coupled to the plurality of transmission interfaces, respectively.

5. The bridge chip of claim 1, wherein when the at least one external device and another device need to perform data transmission, concurrently, the bridge control unit determines an order of the at least one external device and the other device for performing data transmission according to predetermined priority settings of the at least one external device and the other device, wherein the other device represents another external device coupled to the bridge chip or an internal device built in the bridge chip.

6. The bridge chip of claim 1, wherein the at least one external device coupled to the bridge chip comprises at least one wireless communications chip.

7. The bridge chip of claim 6, wherein the at least one wireless communications chip comprises one or more of a Wi-Fi chip, a Bluetooth® chip, a Wi-Fi/Bluetooth® combo chip, a Long Term Evolution (LTE) chip and a ZigBee chip.

8. The bridge chip of claim 1, wherein the at least one external device coupled to the bridge chip comprises at least one storage device.

9. An expansion method for external devices, applicable to a bridge chip, the expansion method comprising:
   utilizing at least one transmission interface within the bridge chip to make at least one external device outside the bridge chip couple to the bridge chip;
   utilizing a bridge control unit within the bridge chip to control priority of the at least one external device for performing data transmission, wherein the step of utilizing the bridge control unit within the bridge chip to control the priority of the at least one external device for performing data transmission comprises:
      utilizing the bridge control unit to control a number of time slots allocated to the at least one external device for performing data transmission according to at least one weighting corresponding to the at least one transmission interface; and
   utilizing a connecting port within the bridge chip to make the bridge chip couple to a host device, to allow the host device to perform data transmission with the at least one external device through the bridge chip.

10. The expansion method of claim 9, wherein the connecting port is coupled to the bridge control unit through an interface conforming to a Peripheral Component Interconnect Express (PCIe) protocol, a Universal Serial Bus (USB) protocol or a Secure Digital Input/output (SDIO) protocol.

11. The expansion method of claim 9, wherein the at least one transmission interface comprises a single transmission interface, the at least one external device comprises a plurality of external devices, and all of the plurality of external devices are coupled to the single transmission interface.

12. The expansion method of claim 9, wherein the at least one transmission interface comprises a plurality of transmission interfaces, the at least one external device comprises a plurality of external devices, and the plurality of external devices are coupled to the plurality of transmission interfaces, respectively.

13. The expansion method of claim 9, wherein the step of utilizing the bridge control unit within the bridge chip to control the priority of the at least one external device for performing data transmission comprises:
   when the at least one external device and another device need to perform data transmission, concurrently, utilizing the bridge control unit to determine an order of the at least one external device and the other device for performing data transmission according to predetermined priority settings of the at least one external device and the other device, wherein the other device represents another external device coupled to the bridge chip or an internal device built in the bridge chip.

14. The expansion method of claim 9, wherein the at least one external device coupled to the bridge chip comprises at least one wireless communications chip.

15. The expansion method of claim 14, wherein the at least one wireless communications chip comprises one or more of a Wi-Fi chip, a Bluetooth® chip, a Wi-Fi/Bluetooth® combo chip, a Long Term Evolution (LTE) chip and a ZigBee chip.

16. The expansion method of claim 9, wherein the at least one external device coupled to the bridge chip comprises at least one storage device.

* * * * *